United States Patent [19]

Gaydos, Jr.

[11] 3,853,114
[45] Dec. 10, 1974

[54] SOLAR HEAT ABSORBER

[76] Inventor: George R. Gaydos, Jr., R.R. Box 3798, Upper Marlboro, Md. 20870

[22] Filed: Mar. 11, 1974

[21] Appl. No.: 450,208

[52] U.S. Cl. .............................................. 126/271
[51] Int. Cl. ............................................. F24j 3/02
[58] Field of Search .................................... 126/271

[56] References Cited
UNITED STATES PATENTS

| | | | |
|---|---|---|---|
| 2,277,311 | 3/1942 | Freeman | 126/271 |
| 3,369,539 | 2/1968 | Thomason | 126/271 |
| 3,815,574 | 6/1974 | Gaydos | 126/271 |

FOREIGN PATENTS OR APPLICATIONS

| | | | |
|---|---|---|---|
| 994,150 | 11/1951 | France | 126/271 |
| 1,176,174 | 4/1959 | France | 126/271 |

Primary Examiner—William F. O'Dea
Assistant Examiner—Peter D. Ferguson
Attorney, Agent, or Firm—Roylance, Abrams, Berdo & Kaul

[57] ABSTRACT

A solar heater having a helix of tubing contained within a transparent box, the box being contained within a second transparent box, forming an air gap between the two boxes on all six sides. The cavity of the internal box around the tubing is filled with a particulate heat adsorbing material such as a mixture of magnetite, perlite and lampblack. The helix is connected to a heat exchange device by tubing sections which extend through walls of the boxes. In one embodiment the boxes are essentially cubes. A further absorber is also disclosed in which a relatively tall, thin box containing a sinuous tubular array is provided with means for mounting the box on a roof of a house. The box is similarly filled with a particulate heat absorbing material and can be provided with double walls.

3 Claims, 5 Drawing Figures

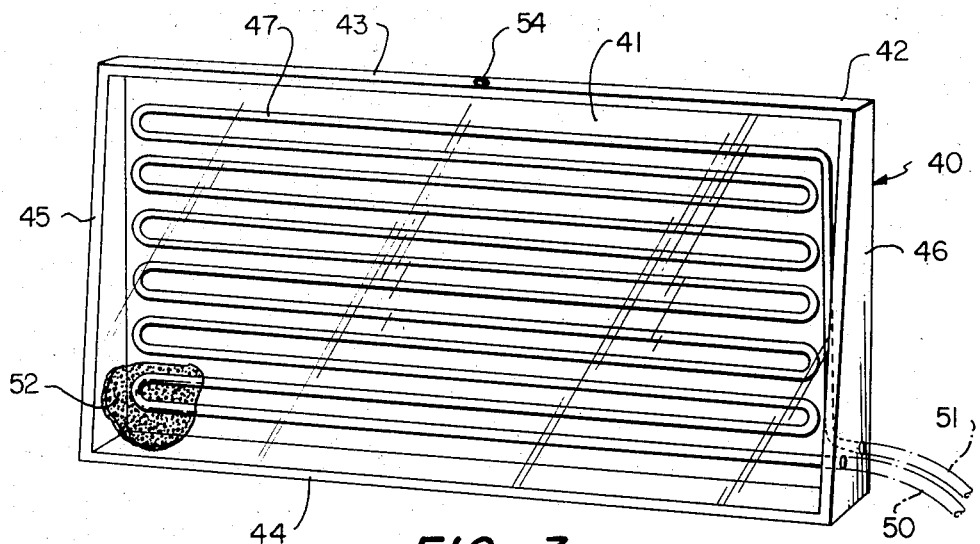
FIG. 3
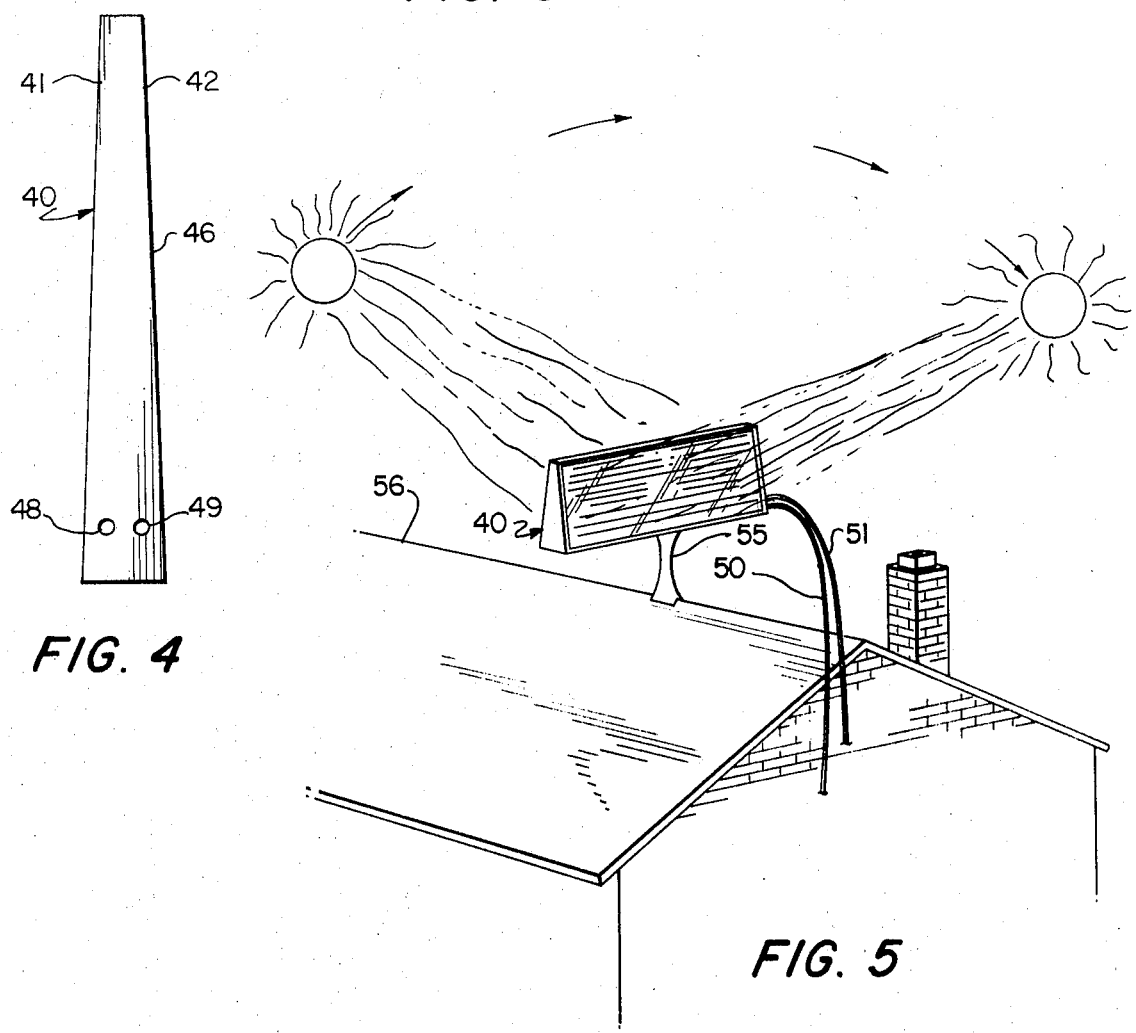
FIG. 4
FIG. 5

SOLAR HEAT ABSORBER

This invention relates to devices for utilizing solar energy and, particularly, to solar energy energy absorbing devices for elevating fluid temperature.

An object of this invention is to provide an improved solar heating apparatus which contains a closed fluid system and heat absorbing material and which is particularly well adapted to be added to an existing structure such as a private home.

An additional object is to provide an absorber which is highly efficient in an environment of relatively low temperatures, such as the northern United States, and which minimizes heat losses due to conduction and convection.

Briefly described, the invention is directed to a rectangular box having at least two transparent walls, the box having contained therein a convoluted or serpentine arrangement of tubing surrounded by particulate heat absorbing material. Conduit means is provided to interconnect the tubing in the box with an external utilization device such as a remotely located heat exchanger. A second box can be provided surrounding the first and spaced therefrom in all directions to establish a dead air space therebetween. The second box has transparent walls coinciding with the first to permit the entry of radiation energy. Means for mounting the device, such as on the roof of a house, can also be provided.

In order that the manner in which the foregoing and other objects are attained in accordance with the invention can be understood in detail, particularly advantageous embodiments thereof will be described with reference to the accompanying drawings, which form a part of this specification, and wherein:

FIG. 3 is a perspective view of a further embodiment of the invention;

FIG. 4 is an end view of the embodiment of FIG. 3; and

FIG. 5 is a diagram showing, schematically, the manner in which the apparatus of FIGS. 3 and 4 can be employed.

Figure 1:
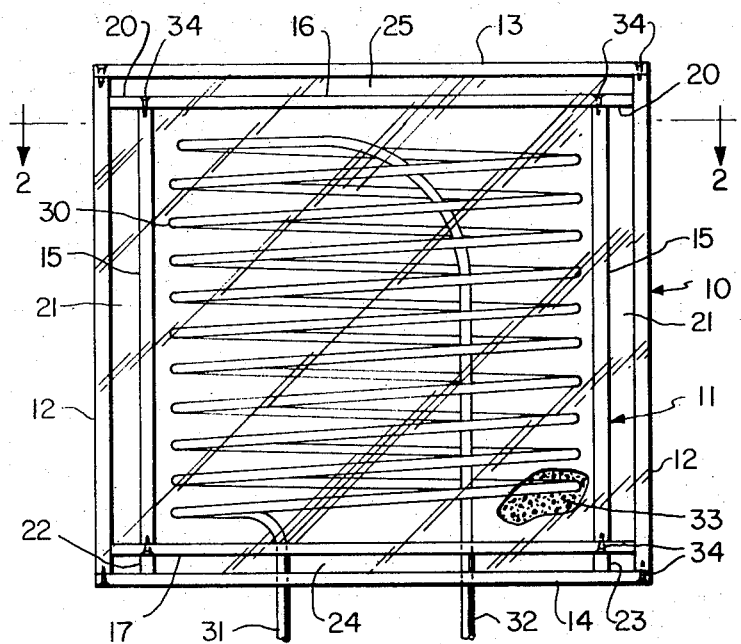
FIG. 1 is a side elevational of one embodiment of the invention.

Referring now to the drawings in detail, it will be seen that FIG. 1 shows an apparatus having an exterior box indicated generally at 10 and an interior box indicated generally at 11. The exterior box is composed of side walls 12, an upper wall 13 and a lower wall 14 and the interior box includes side walls 15, an upper wall 16 and a lower wall 17. Upper wall 16 of the interior box 11 is provided with marginal extension portion 20 which extend outwardly beyond side walls 15 and contact the interior surfaces of walls 12 to act as spacers, forming a gap 21 between walls 15 and walls 12 on all sides of the interior box. These constitute dead air spaces for insulating purposes. Support spacers 22 and 23 are provided between lower walls 17 and 14 so that the interior box is upwardly spaced from the lower wall of the exterior box, providing an additional dead air space 24 between the box bottoms. Spacers 22 and 23 are dimensioned so that the upper walls 13 and 16 of the boxes are spaced apart, creating a dead air space 25.

Walls 15 are preferably made of Plexiglass or a similar plastic material which has a relatively low coefficient of thermal conductivity and, in addition, is transparent to solar radiation. It will be noted that the term "Plexiglass" is a registered trademark of Rohm & Haas Co. signifying an acrylic resin plastic sheet which is a thermoplastic, colorless material which transmits all colors of the visible spectrum with about 91 to 92 percent efficiency, and is inert to many chemicals. Walls 12 can be made of glass panels to better withstand the effects of exposure to the elements, but Plexiglass or the like can alternatively be used. While not all of the walls 12 and 15 need be transparent, it will be apparent that at least two walls thereof must be transparent and, additionally, they should be adjacent ones of the walls in the two boxes.

Contained within interior box 11 is a helical arrangement of tubing 30 having inlet and outlet connecting tubing portions 31 and 32 which pass through walls 17 and 14 of the two boxes. Surrounding helix 30 and substantially filling the interior of box 11 is an aggregation of loose particulate material 33 which is employed to absorb solar energy and retain the heat derived therefrom. For simplicity, most of the particulate material is omitted from FIGS. 1 and 2 so that the coil and wall structure will not be obscured.

As an example of the specific construction technique, the interior box can be contructed of sheets of one quarter inch Plexiglass, each approximately 3 feet square, connected together as illustrated using threaded fasteners as shown at 34 or using a suitable adhesive. In any event, it is desirable to apply adhesive to all joints to prevent undesirable air circulation between cavities. The outer box can be formed from similar and slightly larger sheets of glass or Plexiglass and similarly fastened and adhered together so that the spaces 21, 24 and 25 are essentially sealed air spaces and, therefore, highly insulating. The spaces can conveniently be about one half inch between parallel sheets.

Helix 30 can be formed from three eighth inch copper tubing and, in a box of the dimensions described, about 160 feet of tubing can be employed, resulting in a substantial volume of fluid within the interior chamber at any single time. The tubing should, of course, be coiled with no kinks to impede fluid flow.

The particulate material preferably includes perlite, magnetite and lampblack, the proportions being approximately 8:1:1, respectively, by volume. This particular mixture of materials has been found to be quite suitable in that it absorbs energy from solar radiation and reaches an elevated temperature which effectively heats the liquid within helical conduit 30. A more convenient measure is by weight, the proportions then being 100 lb. of perlite mixed with 50 lb. of magnetite and 25 lb. of lampblack. This mixture has been found to be particularly effective in gathering and holding heat.

Figure 2:
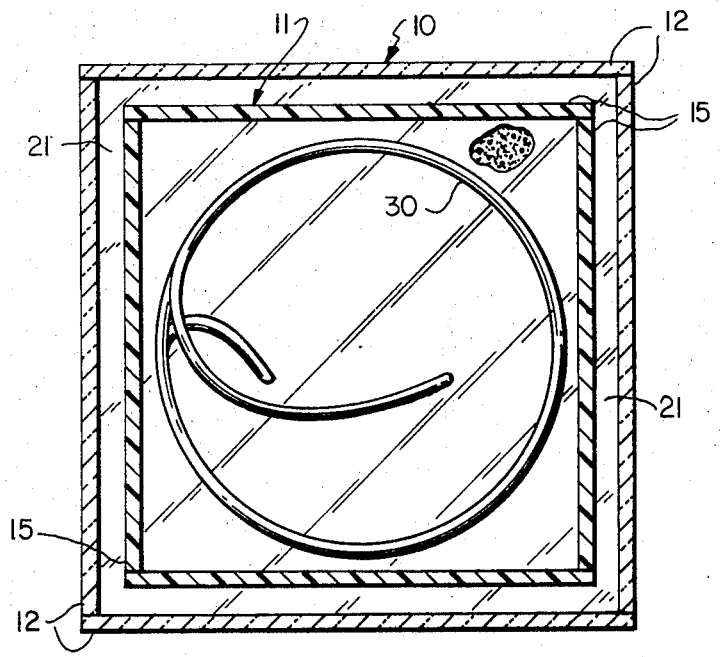
FIG. 2 is a plan view, in partial section, along the lines 2—2 of FIG. 1.

As will be recognized, the apparatus of FIGS. 1 and 2 is designed for use in conjunction with a remote heat exchanger of any conventional type and that the system can employ a pump to circulate any fluid, such as water, through tubing 30 and to the exchanger. Thus, heat absorbed by particulate material 33 is transferred to the tubing and to the fluid contained therein, which fluid is pumped to the other exchanger to elevate the temperature at that location. If desired, a state change of the fluid can also be employed, but the structure as shown is not significantly altered thereby.

Turning now to FIGS. 3–5, the embodiment disclosed therein includes a rectangular box 40 having transparent faces 41 and 42 which are transparent and which constitute, to a significant extent, the largest surfaces of the unit. A frame is in edge-to-edge contact with faces 41 and 42 and includes a top member 43, a bottom member 44 and substantially identical end members 45 and 46. It will be observed in the specific embodiment shown in FIGS. 3–5 that the end members are tapered so that the top is narrower than the bottom, providing a slight slope to surfaces 41 and 42.

Contained within housing 40 is a sinuous array of tubing 47, the end portions of which exit through openings 48 and 49 and form, or are connected to conduits 50 and 51 which are connected to a remote heat exchanger in a manner similar to that described with reference to FIGS. 1 and 2.

The interior cavity of housing 40 is substantially filled with particulate material 52 which surrounds tubing 47 and performs a heat absorbing and transfer function similar to that described in connection with the embodiment of FIGS. 1 and 2. The same mixture of the same materials can be employed. As shown in FIG. 5, unit 40 can be mounted on a standard 55 on the roof 56 of a building with conduits 50 and 51 connected in any convenient fashion to the equipment in the building. Unit 40 can be initially rotatably adjusted so that the sides are exposed to various positions of the sun as illustrated in FIG. 5. The unit is relatively small and light and can clearly be easily mounted on an existing structure.

Typical dimensions for the unit of FIGS. 3–5 employ rectangular glass panels measuring 4 × 8 feet for faces 41 and 42 with end members 45 and 46 being approximately 4 feet tall and tapering from a 3 inch dimension at the top to a 6 inch dimension at the bottom. An opening 54 can be provided in top member 43 to add the particulate material.

While certain advantageous embodiments have been chosen to illustrate the invention, it will be understood by those skilled in the art that various changes and modifications can be made therein without departing from the scope of the invention as defined in the appended claims.

What is claimed is:

1. An apparatus for utilizing solar radiation energy to heat a fluid comprising a first internal container having transparent substantially vertical side walls and top and bottom walls defining a closed interior cavity;

a second external container having transparent vertical side walls and top and bottom walls, the walls of said external container being larger than the walls of said first container;

means for supporting said internal container within said external container with the walls of said containers in substantially parallel, spaced relationship defining air-containing spaces therebetween;

fluid conducting means contained within said internal container in heat exchanging relationship with the interior cavity thereof;

conduit means passing through one of said walls and connecting to said fluid conducting means for conducting heated fluid to a remote location; and particulate radiation and heat absorbing material contained within said internal container, surrounding said fluid conducting means and substantially filling said interior cavity.

2. An apparatus according to claim 1 wherein said particulate material comprises an admixture of perlite, magnetite and lampblack, the components being present in relative ratio of 4:2:1, by weight.

3. An apparatus for utilizing solar radiation energy to heat a fluid comprising a box having a plurality of walls joined at their edges to define a polygon enclosing an interior volume, two of said walls being significntly larger than the remaining walls and being on opposite sides of said box forming major faces thereof, said two walls being transparent to visible radiation;

means for supporting the box such that said major faces are substantially vertical;

a sinuous array of tubing disposed in a plane substantially parallel to said major faces within said interior volume;

particulate radiation and heat absorbing material contained within said interior volume and surrounding said tubing; and fluid conduit means passing through one of said walls and connected to said tubing for conducting fluid thereto.

* * * * *